United States Patent [19]
Jackson et al.

[11] 4,059,207
[45] Nov. 22, 1977

[54] MOTORCYCLE TANK BAG

[76] Inventors: W. Shaun Jackson, 809 Sycamore, Ann Arbor, Mich. 48104; Leslie Eric Bohm, 29560 Rutherland, North, Southfield, Mich. 48076

[21] Appl. No.: 562,262

[22] Filed: Mar. 26, 1975

[51] Int. Cl.$^2$ .............................................. B62J 7/02
[52] U.S. Cl. ........................................ 224/31; 224/9; 224/32 R; 224/35; 280/289 A
[58] Field of Search ...................... 224/29 R, 30 R, 31, 224/32 R, 35, 9, 8 R, 30 A, 32 A, 42.1 E, 42.11, 42.32, 42.39, 42.4, 43, 44, 42.42 R; 180/35; 280/202, 289 A, 5 F; 206/335; 190/42, 59, 60; 119/96; 54/41, 46, 66, 68

[56] References Cited
U.S. PATENT DOCUMENTS

| | | | |
|---|---|---|---|
| 2,409,946 | 10/1946 | MacLeod | 224/42.1 E |
| 2,983,413 | 5/1961 | Verwers | 224/42.4 X |
| 3,136,461 | 6/1964 | Gregg, Jr. | 224/42.42 R |
| 3,322,313 | 5/1967 | Goindi | 224/32 R X |
| 3,765,375 | 10/1973 | Young | 119/96 |
| 3,791,563 | 2/1974 | Raat | 224/31 X |
| 3,938,716 | 2/1976 | Jackson et al. | 224/31 X |
| 3,947,927 | 4/1976 | Rosenthal | 224/45 S X |
| D. 201,795 | 8/1965 | Nimetz | D87/1 R X |

FOREIGN PATENT DOCUMENTS

| | | | |
|---|---|---|---|
| 1,089,543 | 3/1955 | France | 224/42.1 B |
| 812,035 | 7/1949 | Germany | 224/30 |
| 998,941 | 7/1965 | United Kingdom | 224/42.39 |
| 877,460 | 9/1961 | United Kingdom | 224/32 R |
| 1,238,303 | 7/1961 | United Kingdom | 224/9 |
| 446,438 | 4/1936 | United Kingdom | 180/35 |
| 510,205 | 7/1939 | United Kingdom | 224/32 R |
| 853,858 | 11/1960 | United Kingdom | 224/32 R |

*Primary Examiner*—Robert J. Spar
*Assistant Examiner*—Winston H. Douglas
*Attorney, Agent, or Firm*—Krass & Young

[57] ABSTRACT

A tear-drop shaped article carrying bag adapted to be supported on the flat top of a motorcycle fuel tank is formed of a closely woven fabric and has a zipper extending about the line of attachment of the top to the two sides and the narrow front end so that when opened the top lifts forward, as a flap, about the line of attachment to the narrow forward end. A transparent map protector is sewn over the top and access to the area between the protector and the top is attained through a slit formed in the top when the bag is opened. The bottom of the bag rests on a resilient pad with a hole for the protruding fuel cap. A pair of straps surround the pad and the tank and have short auxiliary strap sections extending from their sides which pass through D-rings attached to the bottom of the bag to releasably secure the bag to the tank.

6 Claims, 9 Drawing Figures

U.S. Patent  Nov. 22, 1977  Sheet 1 of 2  4,059,207
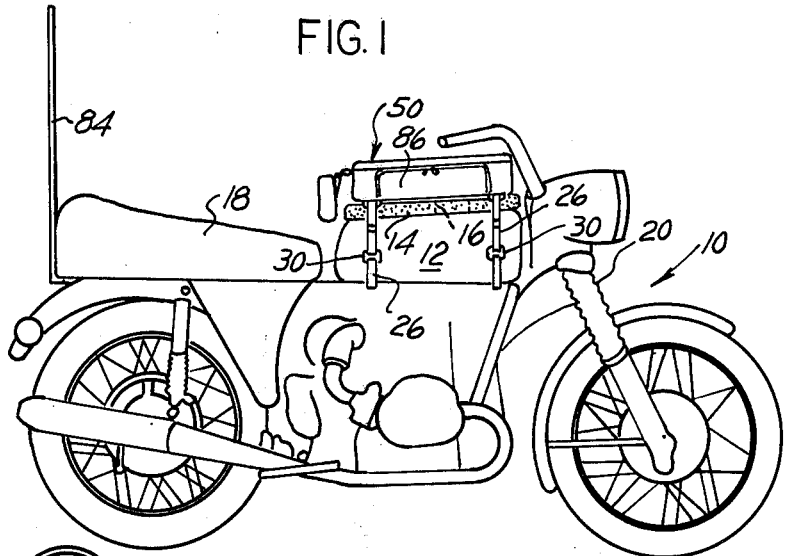
FIG. 1
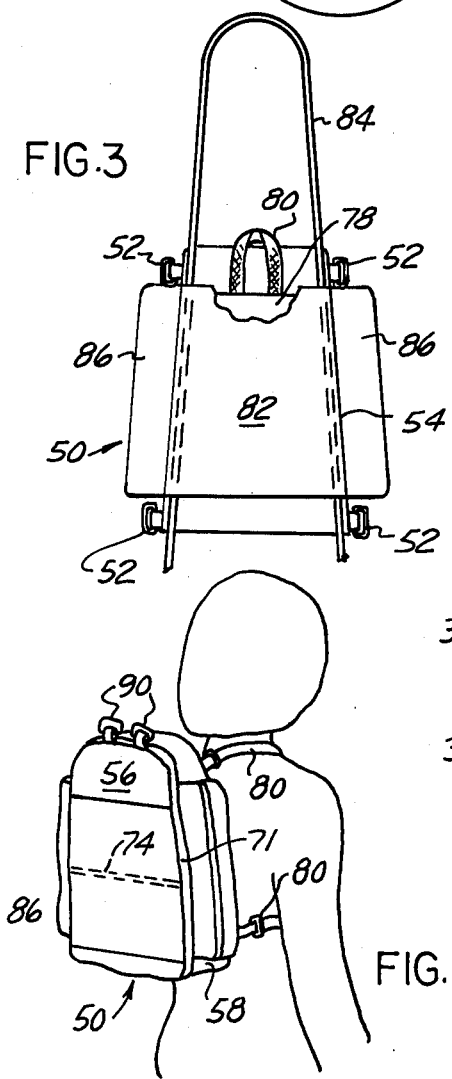
FIG. 3
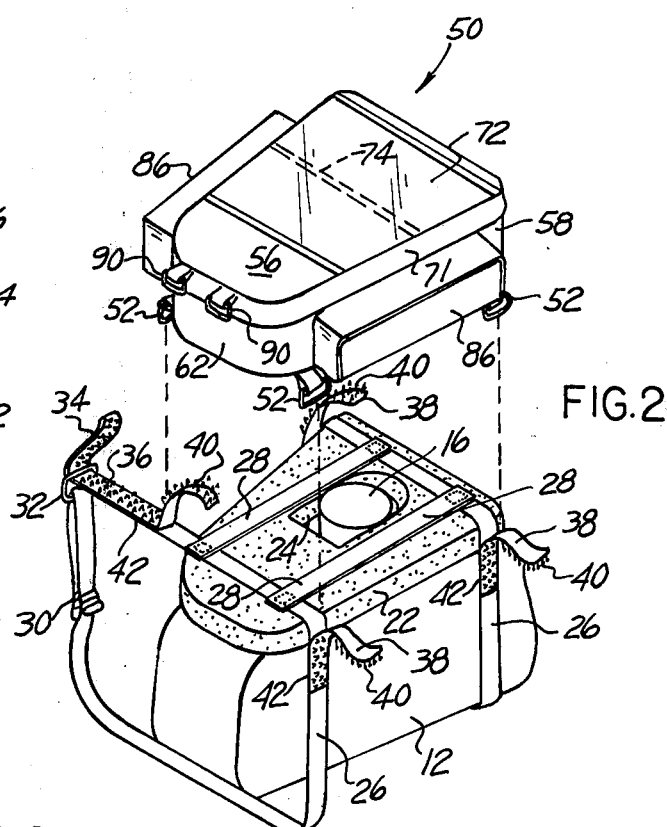
FIG. 2
FIG. 9

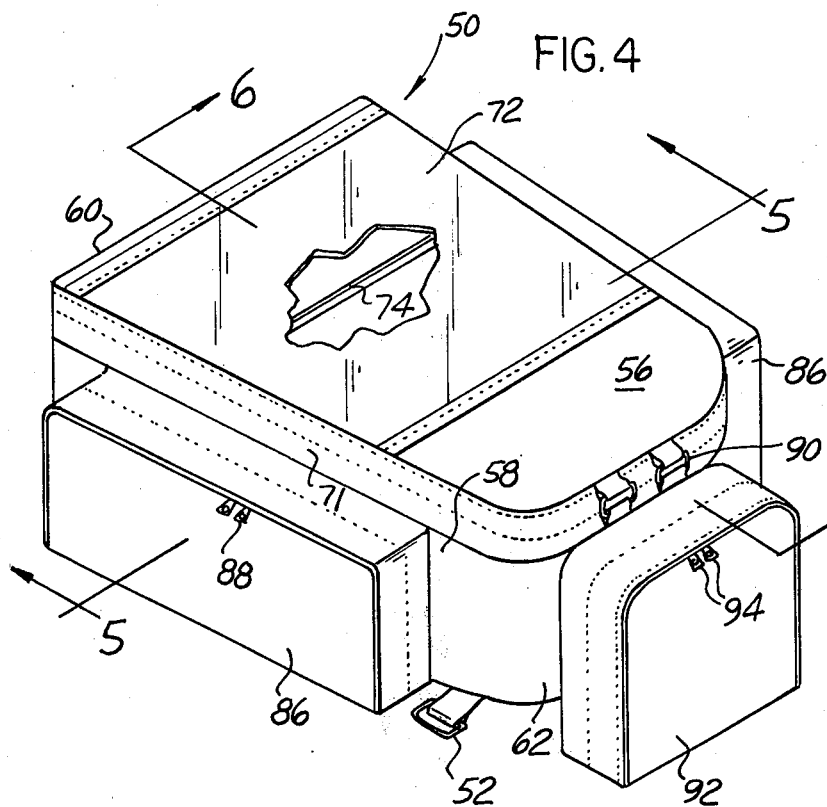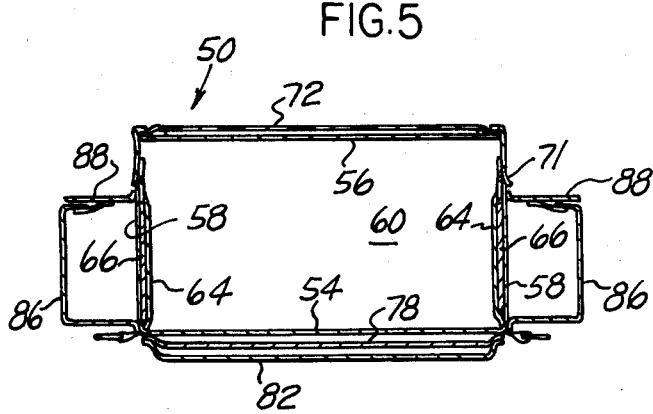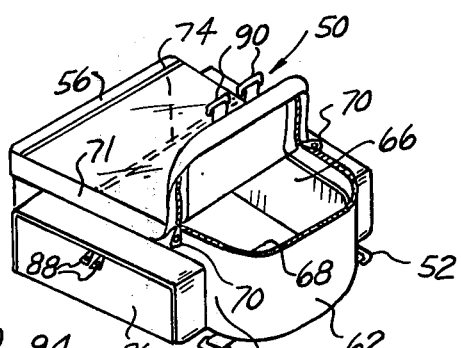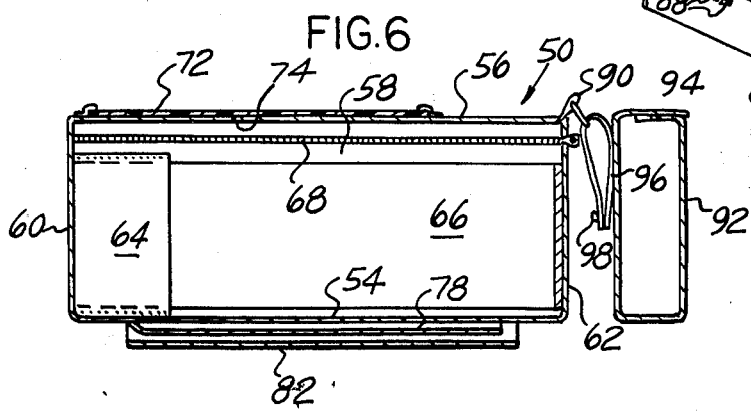

MOTORCYCLE TANK BAG

BACKGROUND OF THE INVENTION

1. Field of the Invention

This invention relates to an article carrying bag adapted to be secured to the top of a motorcycle fuel tank and to a strap system for removably fixing the bag to the tank.

2. Prior Art

Motorcycle fuel tanks generally extend between the driver's seat and steering column, above the engine, and have substantially flat, horizontally disposed tops interrupted only by a fuel cap. This flat surface provides a convenient support for articles to be carried on the motorcycle, and special purpose bags have been devised which attach to the top of the tank by means of straps adapted to surround the tank. These bags suffer from a number of shortcomings such as the difficulty of engaging and disengaging the straps from the fuel tank and the inconvenience of inserting and removing articles while the bag is fixed to the tank. Additionally, the protruding contents of the bag tend to scrape the paint off the top of the tank and the cap projecting from the fuel tank may injure fragile articles disposed in the bottom of the bag.

SUMMARY OF THE INVENTION

The present invention is directed to a tank bag having a number of unique features which particularly add to the convenience and versatility of its use, and to a suspension system for retaining the bag on the fuel tank without the need for securing and removing straps from the tank each time the bag is removed or replaced.

The present invention broadly contemplates an attachment mechanism which may be fixed to the fuel tank on a semi-permanent basis including fastener means for simply and quickly connecting or disconnecting the bag to the semi-permanent structure. In a preferred embodiment of the invention, which will subsequently be disclosed in detail, a flat resilient pad having a central hole through which the fuel cap may protrude is placed on top of the tank to act as a base for the bag and is secured by a pair of straps, joined together in a harness, which surround the pad and the tank. Four short straps having woven hook (Velcro) fasteners on their free ends are attached to the two straps at two pairs of points on the sides of the straps. These short straps are adapted to pass through four wire rings sewn to the corners of the bottom of the bag. Their free ends then connect to woven eye fasteners formed on the straps to quickly attach and detach the bag from the harness.

The rounded forward end of the bag is somewhat narrower than the flat rear end so that the sides taper slightly toward one another in a forward direction. This gives the bag a tear-drop shape so that it fits the top of fuel tanks having a similar shape and is conveniently used as a knapsack with a narrow portion between the wearer's shoulders. The bottom of the bag, which rests against the pad, includes a fabric sleeve sewn to the bag at its side edges. This sleeve is adapted to slip over a bent tubular upright "sissy bar" extending from the rear of the motorcycle so as to alternatively support the bag on that bar. A pocket is also formed in the preferred embodiment of the bag, under the sissy bar sleeve, to retain shoulder straps for convertible use of the bag as a back-pack. In the back-pack mode the narrow rounded tear-drop end is supported between the wearer's shoulders.

The top flap is hinged on its forward edge so that when the zipper is undone and the flap is lifted, a rider on the motorcycle seat has full access to the contents of the bag. The forward hinge also minimizes the possibility of leakage around the zipper. A sheet of transparent plastic is sewn to the top surface of the flap and a slit in the flap below the plastic allows the user to insert and remove maps and similar materials so that they are readily displayed to the driver and are completely protected when the top flap is closed.

The bag has clips at the top of the rear edge for securing a small satellite bag that is easily removed and attached to the driver's belt when he leaves the motorcycle. This bag conveniently stores the rider's wallet, keys and other personal possessions so they do not interfere with his comfort while riding and the rider can attach the satellite bag to his belt when leaving the motorcycle.

Other objectives, advantages and applications of the present invention will be made apparent by the following detailed description of a preferred embodiment of the invention. The description makes reference to the accompanying drawings in which:

FIG. 1 is a side view of a motorcycle having a bag formed in accordance with the present invention secured to the top of the cycle fuel tank;

FIG. 2 is a perspective, exploded view of the bag of FIG. 1 and the fuel tank illustrating the manner of attachment of the strap harness to the tank and the manner of attachment of the bag to the strap harness;

FIG. 3 is a view of a motorcycle sissy bar with the bag of the present invention attached to that bar;

FIG. 4 is a perspective view of the bag of the present invention from the top, with a portion of the transparent map protector broken away for purposes of illustration;

FIG. 5 is a transverse sectional view through the bag taken along line 5—5 of FIG. 4;

FIG. 6 is a longitudinal sectional view through the bag taken along line 6—6 of FIG. 4;

FIG. 7 is a perspective view showing the manner of attachment of the removable belt carrying bag to the belt of the motorcyclist;

FIG. 8 is a perspective view of the bag with the top cover opened; and

FIG. 9 is a perspective view of the bag of the present invention used as a backpack.

Referring to the drawings, the bag of the present invention is adapted to be used on a motorcycle generally indicated at 10 in FIG. 1, of the type having a fuel tank 12 with a substantially flat horizontal upper surface 14 broken only by an upward extending fuel cap 16. The fuel tank is normally disposed between the seat 18 of the motorcycle and the steering column 20. The tank 12 normally has a rear end which is somewhat narrower than the forward end so that the sides of the tank slightly taper toward one another but this shape is not of importance to the present invention.

In order to secure the bag formed in accordance with the present invention to the tank 12, a flat resilient pad 22 is placed over the top surface of the tank. The pad may be generally rectangular or may have a shape more closely adapted to the configuration of the top of a tank. The pad 22 will have a central hole 24 through which the fuel cap 16 may protrude.

The pad 22 is preferably formed of a lightweight resilient plastic foam. Because of the varying location of the fuel cap 16 on different motorcycles, the pad 22 is preferably supplied without a central hole 24. The cyclist may easily cut the pad 22 to form the hole 24 to fit the location of the fuel cap 16 on the motorcycle. The pad 22 will normally have a thickness of about 1 to 2 inches. The top of the fuel cap 16 may project from the top of the tank 12 to a slightly greater or lesser degree.

The pad 22 is secured to the top of the fuel tank 12 by means of a strap harness consisting of a pair of elongated strap sections 26 joined together by a pair of shorter connecting sections 28 which extend generally normally to the strap sections 26 and have their ends secured to the strap sections at a pair of spaced points. As illustrated in FIG. 2, the connecting sections 28 are adapted to lie atop the top surface of the tank 22 so as to extend longitudinally with the aperture 24 between them.

The strap sections 26 each have looped ends 30 which allow their lengths to be adjusted. Wire loops 32 are affixed to the free ends of each of the straps 26. The other end of each strap has a woven fastener of the hook-and-eye type (Velcro) 34 formed in its end so that it may be extended through the wire rings 32 and looped back and fastened to a hook-and-eye fastener 36 of the opposite variety. For example, the free end 34 may contain a woven hook fastener while the section 36 of the strap adjacent the free end 34 contains a woven eye fastener. This allows the free end 34 to be passed through the loop and to be retained to the section 36 so as to form strap 26 into a closed loop. The strap sections 26 are both formed as closed loops surrounding the resilient pad 22 and the tank 12. The lengths of the straps 26 are adjusted by means of the sections 30 so that the straps retain the pad to the tank, as illustrated in FIG. 1.

In order to affix the bag of the present invention to the fuel tank 12, with its semi-permanent installation of the resilient pad 22 and the straps 26, each of the straps 26 is equipped with a pair of short extending strap sections 38. These strap sections are fixed to the straps 26 on opposite sides of the points of attachment of the connecting strap members 28 so that when the straps 28 lay symetrically over the top surface of the pad 22, the short strap sections 38 are positioned adjacent to the sides of the tank 12 at the top.

The free ends of the strap sections 38 each have a woven hook fastener 40 formed on one side and the strap sections 26, adjacent to the connection points of the short sections 38 have woven eye-fasteners 42 formed thereon. This allows the free ends of the straps 38 to be secured to the strap sections 26 adjacent to their bases so as to form short loops.

To secure the bag of the present invention, generally indicated at 50, to the strap harness 26-28, the free ends of the short connecting strap sections 38 are passed through four wire D-ring loops 52 affixed to space points on the bottom of the bag, which will subsequently be described in detail. The free ends of the connecting section 38 are then rejoined to the strap sections 26 by attachment to the sections 42.

The bag 50 is preferably fabricated of a closely woven synthetic fabric material. The bag is formed with a bottom panel 54 and a top 56 panel of generally similar shape, joined together by a pair of sides 58, a front panel 60 and a rear panel 62. The rear panel 62 is somewhat narrower than the front 60 so that the sides 58 are not parallel but taper slightly toward one another in the direction of the rear. The rear end 62 is formed as an integral section with the sides 58 and the corners are gently rounded. The forward end 60 is flat, giving the bag a generally tear-dropped shape. The sides 58, 60 and 62 extend generally normally to the top 56 and the bottom 54 when the bag is in its extended shape.

In order to retain the bag in its extended shape a pair of fabric pockets 64 are formed on the interior of the sides 58 of the bag adjacent to the intersection of those two sides with the forward end 60. The pockets are sewn to the sides 58 along their top and bottom and have their rearwardly extending edges open. An elongated rectangular sheet of plastic stiffening material 66 has its two elongated ends inserted in the opposed pockets so that the stiffening material runs along the interior of the two sides 58 and the back 62 in a U-shape. The stiffening material has a height slightly less than that of the sides 58 and maintains the bag in a substantially extended position. The plastic 64 is readily deformable so as to maintain the deformability of the bag.

The top panel 56 is permanently joined to the top edge of the forward end of the bag 60 and is releasably retained to the sides and rear of the bag by a zipper 68. The zipper preferably has a pair of slide members 70 so that it may be opened from either side. When the zipper is fully opened, the top 56 may be lifted about its joinder with the top edge of the front 60, in the manner of a flap, so that a rider positioned on seat 18 of the motorcycle 10 may have full access to the interior of the bag 50.

The zipper 68 is protected by a short, downward extending channel 71 which extends around the perimeter of the side and rear edges of the flap to extend over the zipper when the bag is closed to protect the zipper from the weather. Since the zipper does not extend across the front 60 of the bag which is primarily exposed to the weather when the motorcycle is in use, the zipper is well protected from atmospheric precipitation.

A rectangular sheet of flexible plastic 72 is sewn to the top 56 of the bag at its four edges. The plastic sheet acts as a map protector. Access may be had to the area between the protector 72 and the underlying surface of the top panel of the bag 56 by means of a laterally extending slit 74 formed in the bag top 56, beneath the protector. Thus, when the top 56 is lifted, maps and other material may be inserted and removed from the area beneath the protector 72. When the zipper 68 is closed the material beneath the protector 72 is directly visible to a rider on a motorcycle.

The bottom of the bag 54 has a fabric pocket 78 formed on its outer side. The pocket 78 is slightly narrower and shorter than the bottom panel 54 of the bag 50. It is sewn to the outside of the bottom panel along its sides and along a line parallel to the forward end 60 of the bag, leaving the edge along the bottom side of the bag 62 open.

The pocket is adapted to retain a set of shoulder straps 80 which may be attached to the rings 52 to convert the bag into a backpack used in the manner illustrated in FIG. 9. The narrow rear end 62 of the bag extends at the top of the backpack between the wearer's shoulders. The broader forward end of the bag 60 rests above the hips of the wearer. This shape is very convenient for use as a backpack. When the backpack straps 80 are not in use they are simply inserted into the pocket 78.

The outer surface of the pocket 78 is in turn covered with a fabric panel 82 which is sewn to the bottom of the bag, just outside of the side lines of attachment of the pocket 78, leaving its upper and lower surfaces open. This panel allows the bag to be supported on the upright inverted U-shaped tubular sissy bar 84 which extends upward from the rear end of the seat of the motorcycle as illustrated in FIG. 3. The panel and the exposed side of the pocket 78 sandwhich the sissy bar. The backpack preferably extends forwardly from the sissy bar to act as a backrest for a second passenger on the seat 18 of the motorcycle.

The preferred embodiment of the bag 50 is equipped with a pair of auxilliary side pockets 86 attached to the outer sides 58 of the bag. Slide fasteners 88 allow the top of the side pockets to be opened.

A pair of metal D-rings 90, attached to the rear or open end of the top panel 56 are adapted to retain a small auxilliary belt bag 92 having a top opening flap secured by a separable fastener 94. The belt bag 92 has a pair of short straps 96 attached to its rear which may be passed through the loops 90 and secured to the bag with snap fasteners 98. The motorcyclist may conveniently keep his wallet and similar valuable personal articles in the bag 92 and remove the bag from the loops 90 and secure it to the belt 100 in the manner illustrated in FIG. 7 when he leaves the motorcycle.

It is thus seen that the bag of the present invention is extremely convenient for the cyclist to use. After he has formed the aperture 24 in the resilient pad 22 to fit the fuel cap 16 of his cycle, he may semi-permanently attach the strap harness 26, 28 to the fuel tank. When he desires to attach the bag 50 to the tank he simply passes the strap ends 38 through the metal loops 52 and secures the flaps to the fastener sections 42. The bag may thus be attached and removed from the cycle in a matter of seconds. When the bag is attached to the cycle the rider may conveniently have access to the full contents of the bag by lifting the top 56 without dismounting from the cycle. Maps and other travel information retained between the transparent protector 72 and the bag top 56 are fully protected from the weather and easily visible to the rider.

The bag may alternately be used as a backpack or supported on the sissy bar of the cycle. The auxilliary side pockets and the bag 92 provide the bag of the present invention with an increased degree of flexibility.

Having thus described our invention, we claim:

1. In an article retaining system adapted to be supported on the upper surface of a motorcycle fuel tank, in combination: a pair of elongated flexible straps; fastener means affixed to said straps so that they may be arranged in loops adapted to surround the tank and thereby be secured to the tank; a flat resilient pad adapted to be secured to the top of the tank beneath the elongated straps to act as a supporting surface for a flexible bag; said flexible bag having a flat side adapted to be supported on the top of the pad and having an opening flap for providing access to the interior of the bag; separable closure means adapted to releasably secure the flap to the bag to close the bag; and quick release fastener means including fastener elements secured to each of said elongated straps and to said bag and adapted to be engaged to releasably retain said bag on said motorcycle fuel tank independently of the securement of the straps to the motorcycle fuel tank by the fastener means, whereby said bag may be quickly installed and released from the motorcycle fuel tank without removal of said straps and pad from said motorcycle fuel tank.

2. The system of claim 1 wherein the upper surface of the tank is interrupted by a gas cap and wherein a central hole is formed in the resilient pad to surround said cap.

3. The system of claim 1 wherein said fastener elements for retaining the bag to the elongated straps includes two pairs of short strap sections, each short strap having one end affixed to one of the elongated straps and four wire rings affixed to the bag and adapted to be engaged by said short strap sections.

4. The system of claim 3 wherein the short strap sections have separable fastener members attached thereto adapted to secure their free ends to the elongated straps.

5. The system of claim 1 wherein the flap is formed on the top surface of the bag and is affixed to the bag along a line extending along the forward side of the bag.

6. An article retaining system adapted to be supported on the horizontal upper surface of the motorcycle tank which has a fuel cap extending upward from the tank comprising: a flat resilient pad having an aperture, adapted to be supported on the upper surface of the gas tank so that the aperture surrounds the fuel cap; a pair of elongated straps having fastener means formed thereon adapted to be formed in loops so as to surround said pad and said tank and secure both the straps and the pad to the tank; and enclosed flexible bag having an opening providing access to the interior thereto and a separable closure means for securing the opening; and quick release fastener means adapted to removably attach the bag to the straps independently of the securement of the straps and the pad to the tank, said quick release fastener means including fastener elements secured to the straps and to the bag and adapted to be engaged to releasably retain said bag to said straps, whereby said bag may be quickly installed and released from the motorcycle fuel tank without removal of said straps and pad from said motorcycle fuel tank.

* * * * *